United States Patent [19]
Stammen

[11] 3,941,213
[45] Mar. 2, 1976

[54] FORK LIFT WITH LIMIT SWITCH CONTROLLED RETRACTABLE GUARD

[75] Inventor: Harold A. Stammen, New Bremen, Ohio

[73] Assignee: Crown Controls Corporation, New Bremen, Ohio

[22] Filed: Feb. 7, 1974

[21] Appl. No.: 440,476

[52] U.S. Cl............... 187/9 R; 187/35; 214/DIG. 7; 296/107
[51] Int. Cl.² ........................................ B66B 9/20
[58] Field of Search... 200/6 A, 47, 61.58 R, 153 T; 296/102, 107, 108, 137 B; 214/DIG. 7, 670–674, 711, 715, 730, 128; 280/150 C; 187/9 R, 9 E, 34, 35

[56] References Cited
UNITED STATES PATENTS

| | | | |
|---|---|---|---|
| 2,602,124 | 7/1952 | Anderson | 200/47 |
| 2,684,773 | 7/1954 | Boyles | 214/672 |
| 3,293,381 | 12/1966 | Eitel | 200/6 A |
| 3,630,317 | 12/1971 | Jacobsson | 280/150 C UX |
| 3,666,052 | 5/1972 | Anderson et al. | 214/128 X |
| 3,693,773 | 9/1972 | Wickham et al. | 200/47 X |
| 3,703,673 | 11/1972 | Balz | 200/47 X |
| 3,827,532 | 8/1974 | Minich, Jr. et al. | 214/DIG. 7 |
| 3,841,698 | 10/1974 | Stammen | 280/150 C X |

Primary Examiner—James R. Scott
Attorney, Agent, or Firm—Biebel, French & Bugg

[57] ABSTRACT

A fork lift with a retractable overhead guard has limit switches built into the mast and one rail of the retractable guard which prevent the fork lift from being raised above a predetermined height when the guard is lowered, and when the fork lift has been raised above the predetermined height with the guard raised, prevents the guard from being lowered.

4 Claims, 6 Drawing Figures

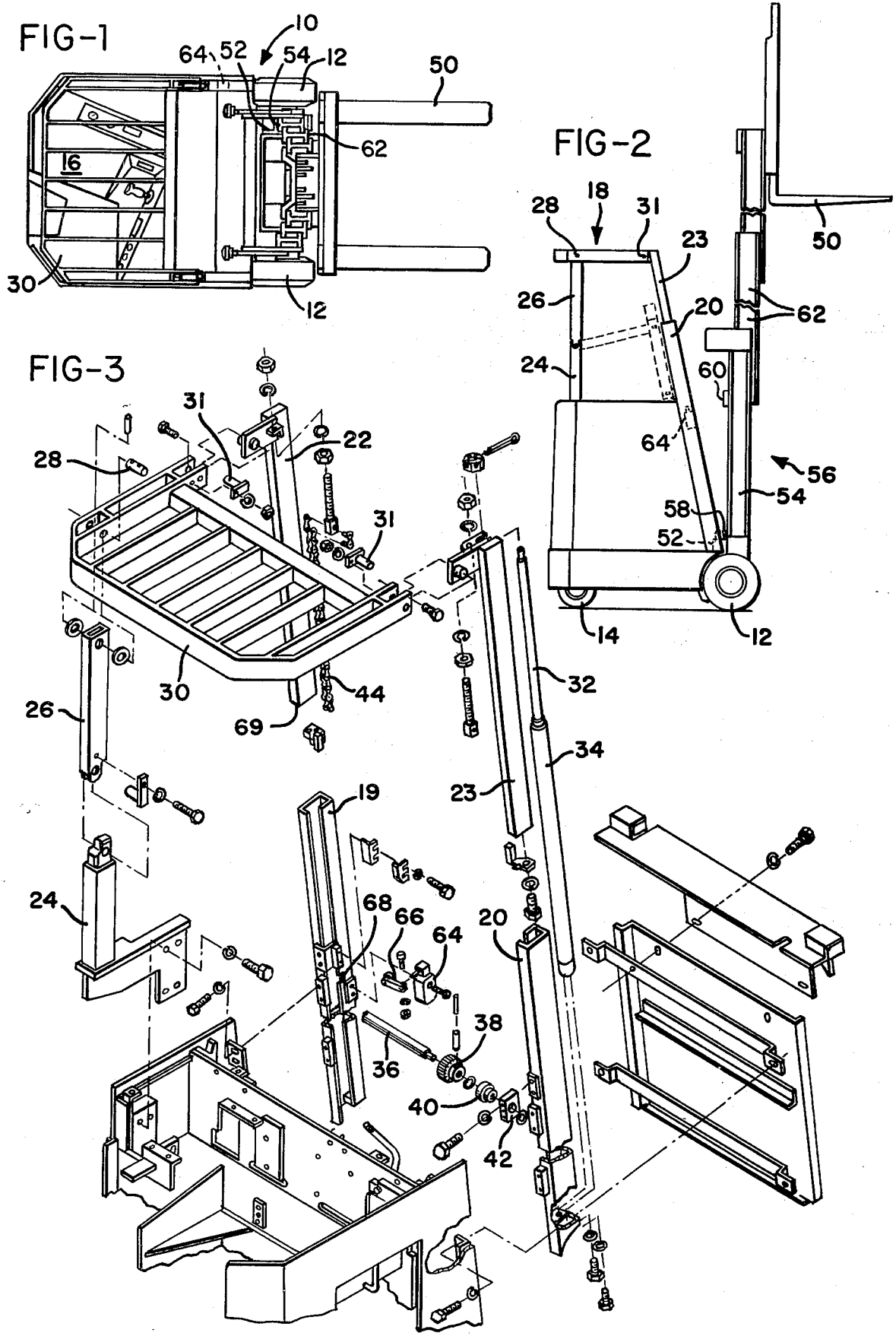

FORK LIFT WITH LIMIT SWITCH CONTROLLED RETRACTABLE GUARD

CROSS REFERENCE TO RELATED APPLICATION

VEHICLE WITH RETRACTABLE GUARD, Ser. No. 335,912, filed Feb. 26, 1973, now U.S. Pat. No. 3,841,698, issued Oct. 15, 1974.

Background of the Invention

It is desirable, and in fact may be required by safety regulations, that fork lifts be provided with overhead guards to protect the operator from falling objects, such as boxes or other articles being stacked by the fork lift.

The overhead guard must extend above the vehicle a distance sufficient to provide head room for the vehicle operator, and while this ordinarily presents no clearance problems in a warehouse or similar storage facility, it may prevent the entry of the vehicle into relatively low clearance areas, such as trucks or railroad cars being loaded by the vehicle.

The above noted related application discloses a fork lift having a retractable guard. This permits the fork lift to be operated, not only in a high ceilinged area, such as warehouses, but also permits the vehicle to enter relatively lower ceilinged areas, such as a truck or railroad car being loaded.

While the retractable feature disclosed in the above noted related application overcomes the problem of insufficient clearance in relatively low ceilinged areas, it will be apparent that in some instances the operator might attempt to raise the fork lift during a stacking or unstacking operation without having first raised the retractable guard to the protective position. Additionally, the operator might attempt to retract the guard while the fork lift was in a raised position.

For the safety of the operator neither of these operations is desirable. However, with the fork lift disclosed in the above noted related application the guard and fork lift may be raised and lowered independently of each other, so that it is possible to lower the guard while the fork lift is in the raised position and to raise the fork lift while the guard is in the retracted position.

Summary of the Invention

The present invention provides means which prevent the fork lift from being raised above a predetermined height unless the guard is in the protective overhead position and prevents the guard from being lowered to the retracted position if the fork lift is raised above the predetermined height.

In accordance with a preferred embodiment of the invention, the mast for the fork lift has mounted thereon a normally open limit switch which is closed by the fork lift being lowered below a predetermined height. This limit switch is in circuit with the overhead guard system so that when the fork lift is raised above the predetermined height the limit switch associated therewith is opened and prevents the guard from being lowered.

A second, normally closed limit switch is built into one rail of the retractable overhead guard and is opened by the guard being retracted. This limit switch is in circuit with the fork lift raising system, so that when the guard is retracted the limit switch associated therewith is opened and the fork lift cannot be raised above the predetermined height.

It will be noted that even with the guard lowered, a limited movement of the mast is permitted, between its lowermost portion and the predetermined height at which the mast switch is opened.

As will be apparent from the following detailed description, the system of the present invention provides an additional safety feature that requires the overhead guard to be in position before the fork lift can be raised above a predetermined height and prevents the guard from being lowered if the fork lift is positioned above the predetermined height.

BRIEF DESCRIPTION OF THE DRAWINGS

FIG. 1 is a plan view showing a fork lift incorporating the present invention;

FIG. 2 is an elevational view thereof;

FIG. 3 is an exploded perspective view of a portion of the vehicle and retracted overhead guard;

DESCRIPTION OF THE PREFERRED EMBODIMENT

Figure 4:
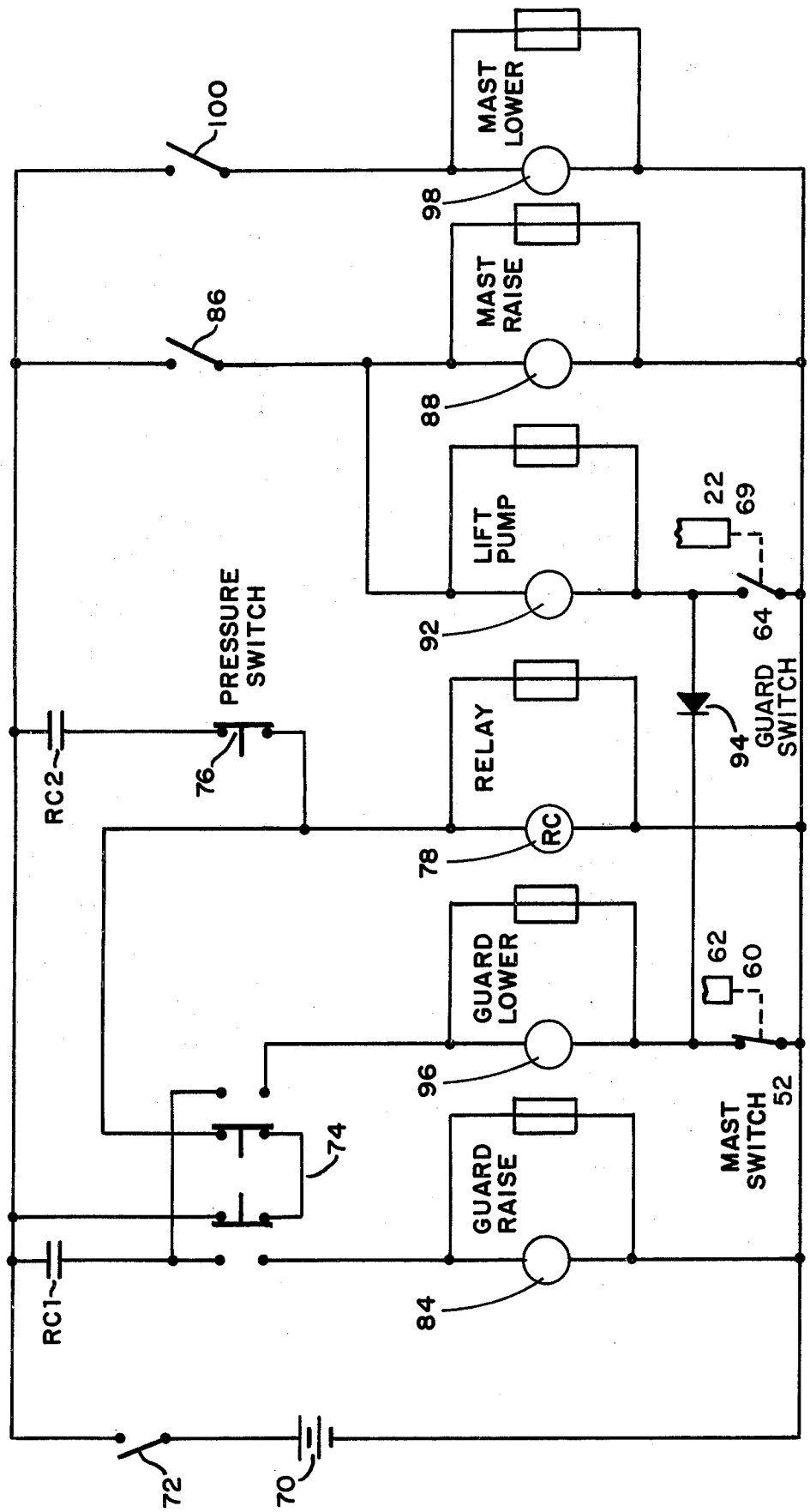
FIG. 4 is a schematic wiring diagram.
Figure 5:
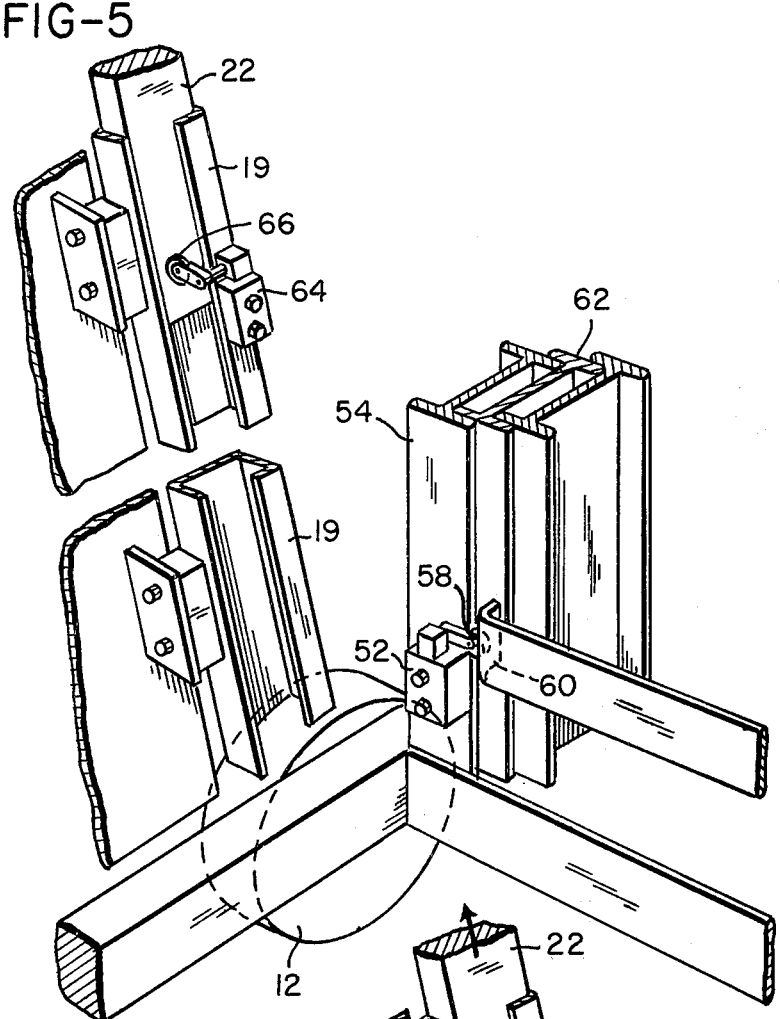
FIG. 5 is an enlarged perspective view showing the position of a portion of the overhead guard mechanism relative to its associated switch when in the retracted position, and position of a portion of the fork lift mechanism relative to its associated switch when the fork lift is between its lowered position and the predetermined height.
Figure 6:
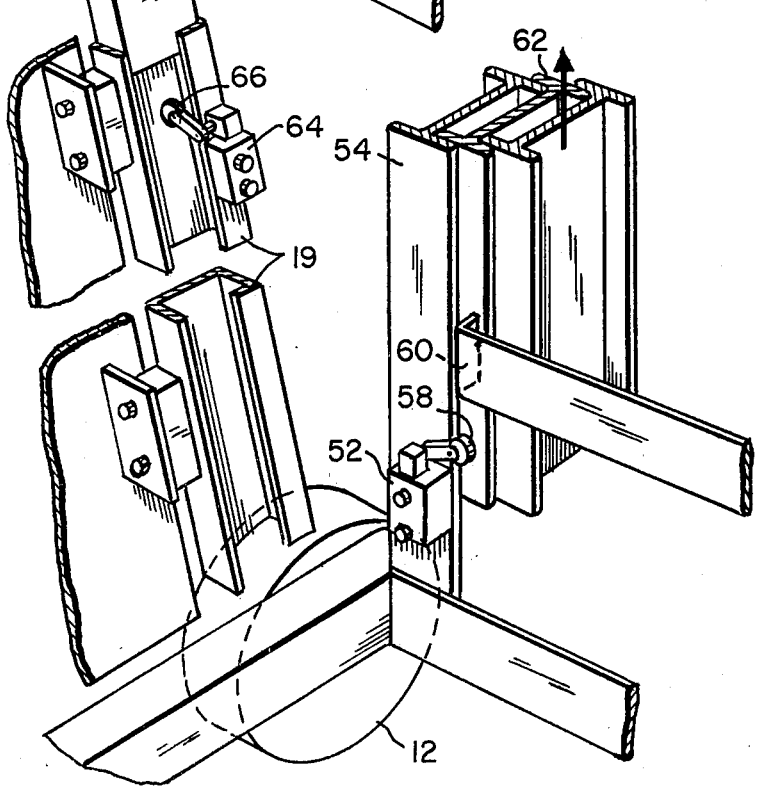
FIG. 6 is an enlarged perspective view similar to FIG. 5 but showing the position of a portion of the overhead guard mechanism when in the extended position and the position of the mechanism associated with the fork lift when the fork lift is above the predetermined height.

As seen in FIGS. 1 and 2 of the drawings, a vehicle 10 in accordance with the present invention includes a pair of front wheels 12 and a pair of steerable rear wheels 14, only one of which is shown in FIG. 2 of the drawings. Preferably the operator station 16 is positioned somewhat diagonally of the vehicle with the vehicle controls accessible from the operator station.

The retractable guard system 18 is described in detail in the above noted related application. For purposes of the present description, it will be sufficient to note in connection with FIGS. 1 through 3 that the retractable guard includes a pair of forward, fixed uprights 19 and 20 of hollow construction telescopically receiving movable upper sections 22 and 23.

A fixed lower link 24 is mounted adjacent the rear of the vehicle 10 and has pivotally attached thereto an upper link 26 which is also pivotally attached by means of a pin 28 to a rear corner of a grid 30. The upper ends of the upper sections 22 and 23 are pivotally attached by means of pins 31 to forward corners of the grid 30, as best seen in FIG. 3 of the drawings.

Also attached to the right hand upright 23 is the upper end of a piston rod 32 which is slidably received in a hydraulic cylinder 34 fixed to the front of the vehicle 10 adjacent its lower end. A cross shaft 36 is provided with a toothed sprocket 38 adjacent each of its ends, only the right hand sprocket being shown in FIG. 3 of the drawings. The shaft and its associated sprockets 38 are rotatably mounted in bearings 40 received in blocks 42 attached to the rear surfaces of each of the fixed uprights 19 and 20.

Each of the movable sections 22 and 23 carries a chain 44, one being shown attached to upright 22, which extends along the inner surfaces of each of the uprights and is engaged by one of the sprockets 38. The chains 44, as explained in detail in the above noted related application, are fixed with respect to their respective uprights and function as racks engaged by the sprockets 38. With this construction it will be seen that pressurizing alternate sides of the cylinder 34 will cause the piston rod 32 to extend or retract with respect to the cylinder 34, moving the right hand upper section 23 inwardly and outwardly of the hollow lower section 20.

This movement of the right hand upright 23 is transmitted through a right hand chain 44 attached to upright 23, right hand sprocket 38, shaft 36 and a left hand sprocket attached to the left hand end of shaft 36 to the chain 44 mounted on the left hand upright 22, causing the left and right hand upper sections 22 and 23 to move inwardly and outwardly of their respective lower sections 19 and 20 in unison.

With the grid 30 pivotally attached adjacent its forward corners to the upper ends of the upper sections 22 and 23 and pivotally attached adjacent its left rear corner to the upper link 26, it will be seen that retracting the upper sections 22 and 23 downwardly into the hollow sections 19 and 20 will cause the grid 30 to pivot from the solid line position shown in FIG. 2 of the drawings to the lowered position shown in dotted lines.

This will allow the vehicle to enter areas with respect to which it would be restricted by the extra height of the extended protective guard. However, it is undesirable from a safety standpoint to have the fork 50 raised, as shown in FIG. 2 of the drawings, while the protective guard 18 is retracted. Therefore, in accordance with the present invention means are provided for preventing the fork 50 from being raised above a predetermined height unless the guard 18 is in the raised protective position, and also to prevent the guard 18 from being lowered to the retracted position while the fork 50 is raised above a predetermined height.

This is accomplished by providing a normally open limit switch 52 mounted on a stationary portion 54 of the mast 56 for raising and lowering the fork 50. The switch arm 58 of the switch 52 is adapted to engage a lower end 60 of the first movable section 62 of the mast so that when the fork 50 is in the raised position shown in FIG. 2 of the drawings, the switch 52 is opened, but when the fork is below a predetermined height lower end 60 contacts the switch arm 58 to close the normally open switch 52.

A second, normally closed limit switch 64 having a switch arm 66 is mounted on the left hand rail 19 with the switch arm 66 extending through a slot 68 into the interior rail 19. With this construction it will be seen that lowering the guard 18 will cause the switch arm 66 to be contacted by the lower end 69 of the left hand movable section 22 to open the normally closed switch 64 while, when the guard is in the extended protective position, the switch 64 will be closed.

Turning to FIG. 4 of the drawings, a schematic wiring diagram is shown depicting the principles of the invention. Thus, the system may be driven by any convenient source of power 70, such as a battery, and is provided with a key switch 72 which is closed when the system is in operation. A selector switch 74 is provided for raising and lowering the guard 18. The selector will normally be in the neutral position shown in FIG. 4 and a pressure switch 76 will normally be closed.

When the key switch 72 is closed relay 78 (RC) will be energized closing relay contacts RC1 and RC2 and locking in the relay 78. Assuming that both the overhead guard 18 and the fork 50 are in their lower, retracted positions, the mast switch 52 will be closed and the guard switch 64 will be open.

If it is desired to raise the guard, the selector switch 74 is moved to the left, completing the circuit through the guard raise solenoid 84 and allowing hydraulic fluid from a constantly pressurized source to be directed through a valve controlled by solenoid 84 to the lower side of the cylinder 34 and causing the guard to be extended to the protective position.

When the guard has raised to its upper position pressure within the cylinder will build up, causing the switch 76 to open and deenergizing the guard raise solenoid 84. Thereafter if it is desired to raise the fork 50, the switch 86 is closed completing the circuit through the mast raise solenoid 88 to position a valve controlled by solenoid 88 properly to direct fluid to a piston and cylinder 89 associated with the mast 56.

At the same time, power is directed to a mast pump solenoid 92, then through a diode 94 and the now closed mast switch 52, causing a mast pump controlled by solenoid 92 to pump fluid to the piston and cylinder associated with the fork lift. As the fork rises above a predetermined height, the mast switch 52 opens. However, the guard switch 64 has been closed by the raising of the guard to the protective position, so that the circuit to the pump solenoid 92 remains completed.

With both the guard and fork in their raised positions, it will be seen that the mast switch 52 is open and the guard switch 64 is closed. Therefore, if the operator should attempt to lower the guard by moving the selector switch to the right, the circuit through the guard lower solenoid 96 will be incomplete because the mast switch 52 is open.

However, the circuit through the mast lower solenoid 98 is complete, so that if the mast lower switch 100 is closed the valve controlled by the solenoid 98 will be positioned to allow the cylinder 89 associated with the mast to be depressurized, the fork 50 then lowering by virtue of its weight. With the fork 50 lowered below the predetermined height, the mast switch 52 is once again closed.

Therefore, if the selector switch 74 is moved to the right the circuit through the guard lower solenoid 96 will be completed, allowing hydraulic fluid from the previously mentioned constantly pressurized source to be directed through a valve controlled by solenoid 96 to the upper side of the cylinder 34 and causing the guard to be lowered to its retracted position. When the guard has been fully lowered, pressure within cylinder 34 will build up, causing switch 76 to open and deenergizing the guard lower solenoid 96.

In summary, it will be seen that with the guard down and the fork down below the predetermined height the mast switch 52 will be closed and the guard switch 64 will be open, allowing the guard to be raised but preventing the fork from being raised above the position at which the mast switch is opened.

The fork is, however, capable of limited movement between its lowermost position and the position at which the mast switch is opened, even when the guard is down.

If the guard is up and the fork is down below the predetermined height, the mast switch and the guard switch will both be closed, allowing the guard to be lowered or the fork to be raised to full height.

If both the guard and fork are up then the mast switch will be open and the guard switch closed. This prevents the guard from being lowered while allowing the fork to be lowered.

It will be seen, therefore, that the present invention provides a system which prevents the fork from being raised above a predetermined height unless the protective guard is in its extended position and prevents the guard from being lowered from its protective position unless the fork is below the predetermined height. However, even when the guard is down the fork has a limited movement capability between its lowermost position and the predetermined height at which the mast switch is opened.

While the form of apparatus herein described constitutes a preferred embodiment of the invention, it is to be understood that the invention is not limited to this precise form of apparatus, and that changes may be made therein without departing from the scope of the invention.

What is claimed is:

1. A vehicle comprising
    a. an operator's station,
    b. an overhead guard positioned at said operator's station,
    c. means for moving said overhead guard between an extended position disposed above said operator's station and a retracted position,
    d. a fork lift mounted on said vehicle for movement between raised and lowered positions,
    e. means for moving said fork lift over the entire range from a lowermost position to a fully raised position,
    f. guard actuated switch responsive to movement of said guard from said extended position thereof and electrically connected to said fork lift moving means to permit movement of said fork lift in a limited range between said lowermost position and a predetermined height and to prevent said fork lift from being raised above a predetermined height when said guard is moved from its said extended position.

2. The vehicle of claim 1 further comprising:
    a. fork lift actuated switch means electrically connected to said guard moving means and being responsive to said fork lift being above said predetermined height to permit unrestricted movement of said guard between its retracted and extended positions when said fork lift is below said predetermined height and to prevent movement of said guard from said extended position when said fork lift is above said predetermined height.

3. A vehicle comprising
    a. an operator's station,
    b. an overhead guard positioned at said operator's station,
    c. means for moving said overhead guard between an extended position disposed above said operator's station and a retracted position lowered from said extended position,
    d. a fork lift mounted on said vehicle for movement between fully raised and fully lowered positions, and
    e. fork lift actuated switch means electrically connected to said guard moving means and being responsive to movement of said fork lift above a predetermined height between said fully raised and said fully lowered position to permit unrestricted movement of said guard between its retracted and extended positions when said fork lift is below said predetermined height and to prevent movement of said guard from said extended position thereof when said fork lift is above said predetermined height.

4. In a vehicle including
    an operator's station,
    a retractable overhead guard positioned at the operator's station,
    means for moving said overhead guard between an extended position disposed above said operator's station and a retracted position lowered from said extended position,
    a fork lift mounted on said vehicle,
    means for moving said fork lift between raised and lowered positions,
    the improvement comprising
    first switch means responsive to the position of said guard and being in the first condition when the guard is in the extended position and in a second condition when the guard is not in its extended position,
    second switch means responsive to the position of fork lift and being in a first condition when said fork lift is in its lowered position and not raised above a predetermined height and in a second condition when said fork lift is raised above said predetermined height, and
    circuit means connected to said first and second switch means for controlling the operation of said means for moving said guard and said fork lift whereby
    a. when said first switch means is in its first condition, said fork lift may be operated without restriction;
    b. when said first switch means is in its second condition, said fork lift may be operated only between its lowered position and said predetermined height;
    c. when said second switch means is in its first condition, said overhead guard may be moved between its extended position and its retracted position; and
    d. when said second switch means is in its second condition, said means for moving said overhead guard is disabled thereby preventing said guard from being moved from its extended position when said fork lift is raised above said predetermined height.

* * * * *